Dec. 10, 1940. H. C. BOSTWICK 2,224,336
VULCANIZING PRESS
Filed July 14, 1939
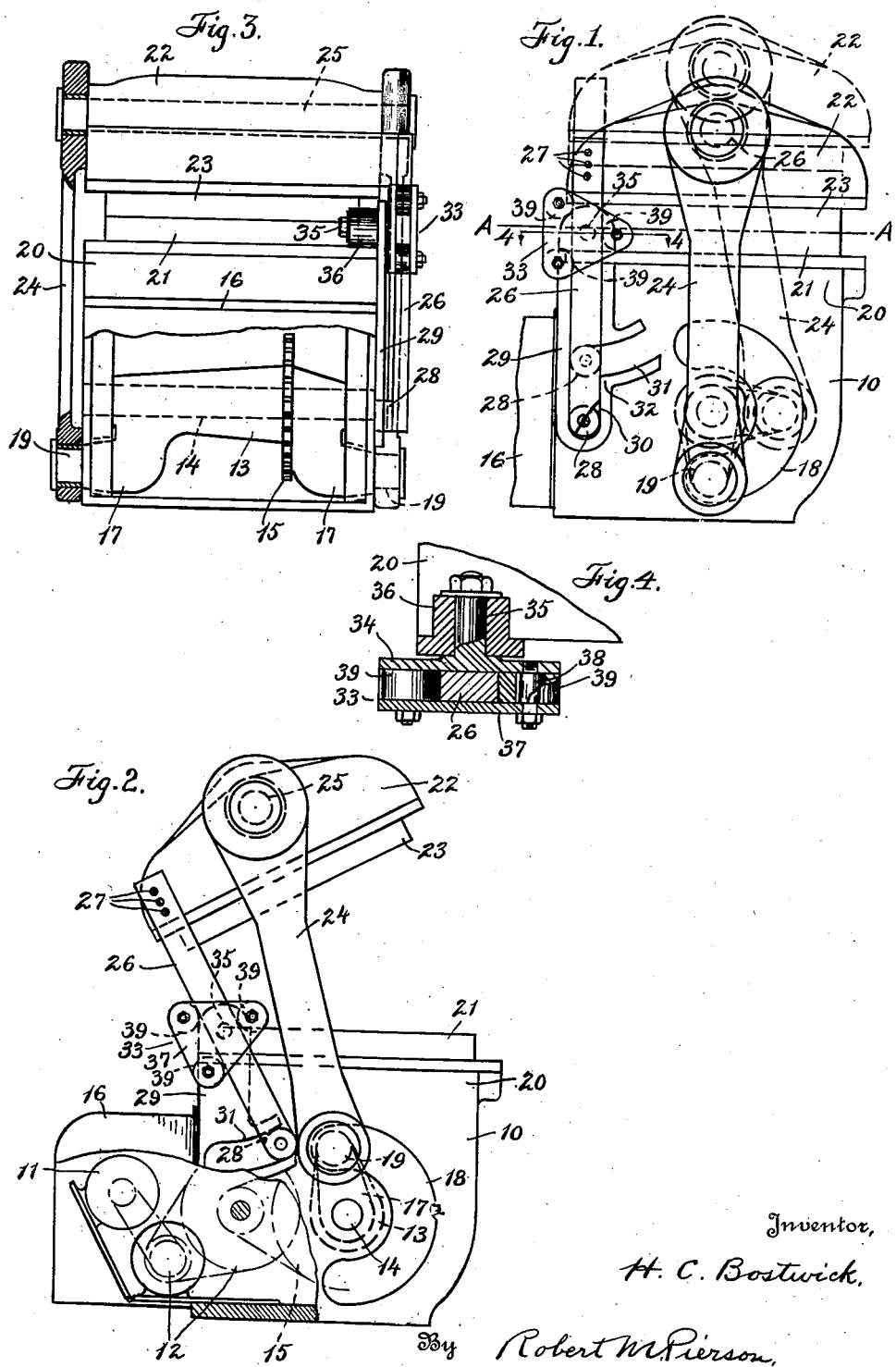
Inventor,
H. C. Bostwick,
By Robert M. Pierson,
Attorney Patented Dec. 10, 1940

2,224,336

UNITED STATES PATENT OFFICE 2,224,336

VULCANIZING PRESS

Henry C. Bostwick, Coventry Township, Summit County, Ohio, assignor to The Akron Standard Mold Company, Akron, Ohio, a corporation of Ohio Application July 14, 1939, Serial No. 284,475

8 Claims. (Cl. 18—17)

This invention relates to molding presses for rubber shaping, vulcanizing and analogous operations. It further relates mainly to toggle presses and especially those of the upwardly-opening, swinging-platen type employing on each side a single toggle with underneath cranks and pitman links extending to the upper press head and folding into closed position,—but is not wholly confined to such variety or type of presses.

Principal objects of the invention are to provide simple, compact and relatively inexpensive motion controlling mechanism including an improved combination of fixed cam and slidable guide devices for imparting desired movements to the movable press head or platen under impulse of the power toggles.

Of the accompanying drawing,

Fig. 1 is a side elevation of a toggle press embodying my invention in a preferred form, shown in closed position in full lines and in partly-open position in broken lines.

Fig. 2 is a similar view of the press in a fully-open position.

Fig. 3 is a rear elevation with part of the drive casing removed, omitting most of the toggle drive.

Fig. 4 is a detail section on a larger scale, on the line 4—4 of Fig. 1.

In the drawing, 10 is a hollow base containing an electric motor 11 and speed-reduction drive mechanism 12 for the horizontal toggle crankshaft casting 13 which is journaled on a bearing rod 14 having its ends supported on the side walls of the base, said crank shaft having a final-drive chain sprocket 15. The motor and drive mechanism is partly housed in a removable hood or casing member 16 forming a rear base extension.

Formed at opposite ends of the casting 13 are duplicate cranks 17 projecting through arcuate slots 18 in the base sides and including crank pins 19.

20 is a fixed lower press head or platen horizontally formed on the upper side of the base 10 and removably carrying the lower member 21 of a suitable mold such as one for externally shaping and vulcanizing a pneumatic tire casing, or a mold for any other desired purpose. 22 is a movable upper press head or platen to whose lower face is detachably secured a complemental upper mold member 23. A—A represents the parting or dividing plane between the mold-carrying press heads. 24, 24 are a pair of pitman links for operating the movable head, said links having their lower ends pivoted on the crank pins 19 and their upper ends pivoted on the ends of a journal pin 25 extending horizontally through said upper head 22.

In many molding presses, especially those for tire vulcanizing, it is desirable to impart to the movable head successive substantially rectilinear and swinging opening movements in order properly to release the upper mold member from the work and expose said work for easy removal; and further to permit easy reloading and a proper engagement and confinement of the work when the press is closed. My invention includes a simple, durable and relatively inexpensive means for controlling these movements, as will now be described.

26 is a slidable and swinging guide rod of rectangular section, located on one side of the press, having its upper end attached to the rear end of the movable press head 22, in this case fixedly by screw fastenings 27, and extending downwardly past the dividing plane A—A of the molds and heads. At its lower extremity this rod carries a roller 28 working in a cam guide bracket 29 which is fixed to the side wall of the base 10. Said bracket has a vertical slot or channel portion 30 open at its upper end and a lateral, forwardly-extending arcuate channel portion 31 communicating with said upper end, together with an angular shoulder 32 at the crotch between these channel portions.

The intermediate portion of the rod 26 slidingly occupies a fulcrum guide 33 having a 3-point roller bearing embracing the rod. Said guide has a triangular frame composed of an inner plate 34 formed with a horizontal pivot shaft 35 in a stationary or fixed bearing 36 on the rear upper side of the base 10 and an outer plate 37 detachably secured to the inner plate by journal screws 38. On the stems of said screws are mounted to turn freely the three bearing rollers 39 which are disposed, two on the rear side of the rod 26 and one on its front side.

In the operation of the described press, starting from its closed position shown in full lines in Figs. 1 and 3, the electric motor 11 is energized to rotate the crank-shaft 13, through the intermediate driving devices 12, 15, counter-clockwise through substantially a semicircle. At the completion of the opening and closing movements the motor is automatically stopped through the operation of suitable limit switches of a familiar nature, not shown. During the first part of the opening movement, while roller 28 is in the vertical cam channel 30, the head 22 rises in a rectilinear path to the broken-line position shown in Fig. 1. The mold is arranged so that the work generally sticks in the lower member 21 and this rectilinear movement permits a proper release of said work from the upper member 23. When roller 28 reaches the upper end of the vertical channel portion 30, a continuation of the upward movement imparted by the toggles causes the upper head 22 to swing rearwardly toward the fully-open position indicated in Fig. 2, with the aid of the rod 26, sliding through the roller frame 33 which turns on the fulcrum pin 35, while the rod roller 28 moves forwardly into the cam channel 31 past the shoulder 32, said upper head attaining its fully-open position at the completion of this movement as the crank pins 19 reach the upper ends of the slots 18. During the final upward movement the work may be suitably ejected from the lower mold member 21 and then easily removed. Upon reloading the mold, it is closed by a reversal of the foregoing operations.

It will be understood that the described embodiment may be variously modified within the scope of the appended claims.

I claim:

1. A press having a movable head, means for moving it, a rod attached to the head, a fixed cam and a fulcrum guide means for said rod, said guide means being pivoted in a stationary bearing.

2. In a molding press, the combination of mold-carrying heads including a movable head, toggle means for operating the latter, and means for imparting successive substantially rectilinear and swinging opening movements to said movable head, including a slidable and swinging member attached thereto and extending past the dividing plane of the heads, and a fixed-cam and pivoted guide means spaced apart longitudinally of the slidable and swinging member for guiding said member, said guide means being pivoted in a stationary bearing.

3. A press according to claim 2 having fixed lower and upwardly-opening upper heads, and toggles on opposite sides, foldable into press-closing position, including a crank-shaft under the fixed head, having a pair of cranks at opposite sides of the press, and a pair of pitman links pivoted at their lower ends to said cranks and at their upper ends to the movable head.

4. A press according to claim 2 having fixed lower and upwardly-opening upper heads, and a rod constituting the slidable and swinging member, fixedly attached at its upper end to the upper head.

5. A molding press having a pair of heads, one of which is movable, a rod attached at one end to said movable head, fixed cam guide means for the opposite end of said rod, and an intermediate pivoted fulcrum guide embracing the rod.

6. A press according to claim 5 in which the intermediate guide has a three-point roller bearing on the rod.

7. A press according to claim 5 in which the intermediate guide comprises an inner plate pivoted on the base, an outer plate detachably secured to said inner plate, and three rollers mounted between the plates, two on one side and one on the opposite side of the rod.

8. A molding press having a base provided with a lower press head, a complemental movable upper press head, a guide rod having its upper end fixedly secured to said upper head, cam means fixed on the base, having a longitudinal rod-engaging portion for guiding the upper head in a substantially rectilinear path during the first part of its opening movement and a lateral rod-engaging portion for guiding the head in a swinging path during the latter part of said opening movement, and a fulcrum guide, pivoted on the base and embracing said rod between its ends.

HENRY C. BOSTWICK.